US008649674B2

(12) United States Patent
Sugiura

(10) Patent No.: US 8,649,674 B2
(45) Date of Patent: Feb. 11, 2014

(54) LENS DRIVER

(75) Inventor: Koichi Sugiura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 41 days.

(21) Appl. No.: 13/095,114

(22) Filed: Apr. 27, 2011

(65) Prior Publication Data

US 2011/0200316 A1    Aug. 18, 2011

(30) Foreign Application Priority Data

May 13, 2010   (JP) ................................ 2010-111061
Oct. 1, 2010    (JP) ................................ 2010-223585

(51) Int. Cl.
*G03B 17/00*     (2006.01)
*G03B 3/10*      (2006.01)

(52) U.S. Cl.
USPC ............................................. 396/85; 396/131

(58) Field of Classification Search
USPC ............. 396/85–88, 131–133, 135, 137, 147, 396/281, 290–291; 359/825
See application file for complete search history.

(56) References Cited

U.S. PATENT DOCUMENTS

| 5,771,410 A * | 6/1998 | Sato et al. ........................ 396/79 |
| 6,937,285 B2 * | 8/2005 | Ohkawara ....................... 348/357 |
| 2004/0165879 A1 * | 8/2004 | Sasaki et al. ................... 396/137 |

FOREIGN PATENT DOCUMENTS

| EP | 0 503 572 B1 | 9/1998 |
| JP | 4-281416 | 10/1992 |
| JP | 2001-166196 | 6/2001 |
| JP | 2004-286822 | 10/2004 |

OTHER PUBLICATIONS

JP 2001-166196 A Machine Translation available from JPO website.*

* cited by examiner

*Primary Examiner* — WB Perkey
*Assistant Examiner* — Minh Phan
(74) *Attorney, Agent, or Firm* — Oblon, Spivak, McClelland, Maier & Neustadt, L.L.P.

(57) ABSTRACT

A lens driver having a manually operated ring, rotation detection means for detecting rotation direction and rotating speed of the manually operated ring on the basis of rotation the manually operated ring, a switching means for switching a control mode, on the basis of detection result of the rotation detection means, between a normal control mode in which a lens is driven at normal driving speed depending on rotating speed of the manually operated ring and a high-speed control mode in which the lens is driven at high driving speed which is faster than the normal driving speed, and a driving control means for controlling a driving means so that the lens is driven at the normal driving speed when the normal control mode is set and controlling the driving means so that the lens is driven at the high driving speed when the high-speed control mode is set.

11 Claims, 9 Drawing Sheets

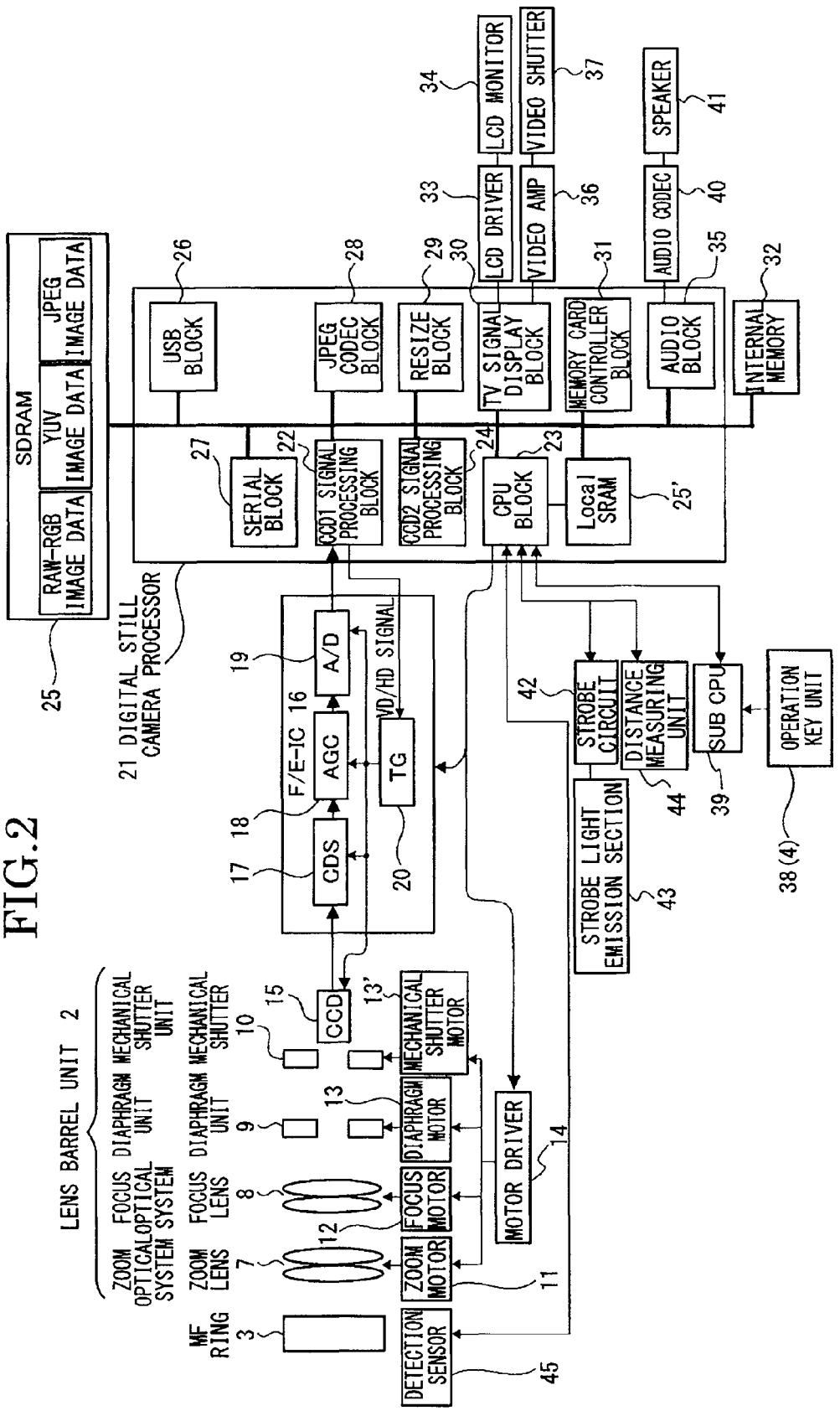

FIG.3A
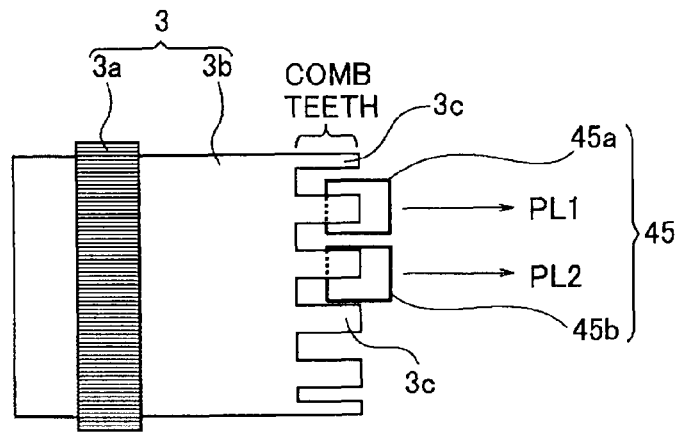
FIG.3B
POSITIVE DIRECTION ROTATION SIGNAL
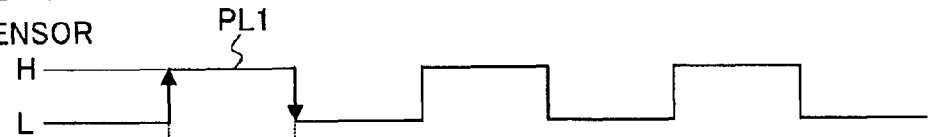
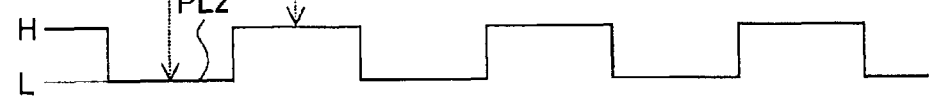
FIG.3C
NEGATIVE DIRECTION ROTATION SIGNAL
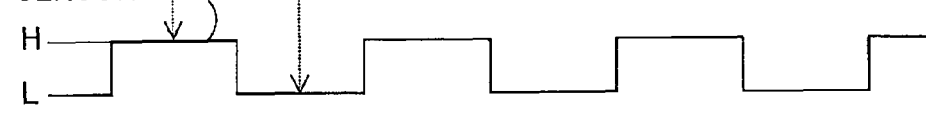

| DISTANCE | ∞ | 10m | 5m | 3m | 1m | 30cm | 20cm |
|---|---|---|---|---|---|---|---|
| LENS POSITION | 0 | 2 | 4 | 7 | 25 | 93 | 158 |

LENS DRIVER

CROSS-REFERENCE TO THE RELATED APPLICATIONS

This application is based on and claims the priority benefit of each of Japanese Patent Application No. 2010-111061, filed on May 13, 2010, and Japanese Patent Application No. 2010-223585, filed on Oct. 1, 2010, the contents of which are incorporated herein by reference.

BACKGROUND OF THE INVENTION

1. Field of the Invention

The present invention relates to a lens driver which converts rotation of a manually operated ring into pulse signals and drives a lens on the basis of the pulse signals.

2. Description of the Related Art

Conventionally, a lens driver which converts rotation of a manually operated ring into pulse signals and drives a lens on the basis of the pulse signals has been known (see, for example Japanese Unexamined Patent Application Publication No. Hei-4-281416 (hereinafter referred to as Patent Document 1)).

It is difficult to drive a motor according to the amount of rotation of the manually operated ring with high fidelity, stop the motor in a focused state, and maintain the focused state. In order to solve this problem, the lens driver disclosed in this Patent Document 1 is configured such that the driving of the motor is forcibly stopped once the focused state is detected.

In addition, as this type of lens driver, there are also known a lens driver which can provide two-step driving speed according to a rotation angle of a manually operated ring and a lens driver of two-phase pulse system which determines driving speed of a lens according to rotating speed of a manually operated ring (see, for example, paragraphs to [0009], [0011], [0065], and [0070] of Japanese Patent Application Publication No. 2001-166196 (hereinafter referred to as Patent Document 2)).

In the lens driver of the two-phase pulse system with the manually operated ring, two-phase pulses corresponding to the rotating speed of the manually operated ring are outputted from an encoder, rotation direction and rotating speed are detected on the basis of the pulse signals, and a lens is driven by a motor as lens driving means.

In the lens driver disclosed in Patent Document 2, the lens is switched to move, at high speed for the photographing on the telescopic side where lens driving amount is large, and at low speed or the photographing on the wide angle side where lens driving amount is small. In addition, the lens is switched to move at higher speed for the macro photographing involving a large amount of lens extension than for the non-macro photographing. In these ways, the lens driver disclosed in Patent Document 2 achieves swift lens driving with a manually operated ring for the macro photographing.

Thus, the conventional lens driver has the following problem in performing a focusing operation using a manually operated ring (also referred to as an MF ring) when employed in a camera with a high-power zooming function or a camera equipped with a macro photographing mode. To be specific, the conventional lens driver has difficulty in swift focusing during telephoto zooming and in macro photographing because a lens movement amount is large, requiring much time for the lens movement.

The lens driver of two-phase pulse system has the following problems. Although moving time is reduced with high rotating speed of a manually operated ring, an object of accurately positioning a lens at a target focused position through fine adjustment cannot be achieved if the lens is driven at high speed regardless of the rotating speed of the manually operated ring. On the other hand, swift driving of the lens demanded by a user cannot be achieved if the driving speed is changed only depending on the speed of the manually operated ring rotated by a user.

In addition, in the conventional camera, the extension amount of a focus lens and a distance to a subject are coarsely correlated on the long distance side. That is to say, lens position resolution is coarse. To the contrary, on the short distance side, the extension amount of the focus lens and the distance to the subject are finely correlated, and thus the lens position resolution is dense.

Therefore, when the focus lens is moved by rotating the manually operated ring, pulse responsiveness on the long distance side is sensitive. Thus, when the focus lens position is on the long distance side, it is difficult to stop the focus lens at a desired position by operating the manually operated ring.

That is to say, in the conventional lens driver of the two-phase pulse system, the advantage of operating the manually operated ring has not been well utilized and it cannot be necessarily said that user friendliness is sufficient.

SUMMARY OF THE INVENTION

The present invention is made in view of the circumstances mentioned above, and an object of the present invention is to provide a lens driver of two-phase pulse system with a manually operated ring which can achieve both the user's demand for swift driving of a lens and demand for accurate positioning of the lens at a target focused position through fine adjustment.

In addition, from a different standpoint, the object of the present invention is to provide a lens driver which can reduce response sensitiveness to the amount of rotation of the manually operated ring when the focus lens position is on the long distance side and, to the contrary, increase the response sensitiveness to the amount of rotation of the manually operated ring when the focus lens position is on the short distance side.

A lens driver according to a first aspect of the present invention includes: driving means configured to drive a lens; a manually operated ring provided on a lens barrel and configured to be manually rotated relative to the lens barrel; rotation detection means configured to detect rotation direction and rotating speed of the manually operated ring on the basis of the rotation of the manually operated ring; switching means configured to switch a control mode, on the basis of detection result of the rotation detection means, between a normal control mode in which the lens is driven at normal driving speed depending on rotating speed of the manually operated ring and a high-speed control mode in which the lens is driven at high driving speed which is faster than the normal driving speed in the normal control mode; and driving control means configured to control the driving means so that the lens is driven at the normal driving speed when the normal control mode is set and to control the driving means so that the lens is driven at the high driving speed when the high-speed control mode is set.

The rotation detection means may generate count pulses according to rotation of the manually operated ring. The driving control means may determine start of rotation of the manually operated ring on the basis of rising of the count pulses, and set the number of pulses of driving pulses which drive the driving means depending on a cycle of the count pulses and in synchronization with the count pulses. The number of driving pulses to be generated in the high-speed control mode may be twice the number of driving pulses to be generated in the normal control mode.

If the lens driver is thus configured, the lens can be driven at high speed while following operator's intention of high-speed driving with high fidelity, because the lens can be moved or extended at driving speed which is twice as that in the normal speed when high speed lens is required.

Furthermore, the configuration may be such that the rotation detection means generates count pulses according to rotation of the manually operated ring, and the driving control means determines start of rotation of the manually operated ring on the basis of rising of the count pulses, sets the number of pulses of driving pulses which drive the driving means depending on a cycle of the count pulses and in synchronization with the count pulses in the normal control mode, continuously drives the driving means at fixed high speed in the high-speed control mode regardless of a change in a cycle of the count pulses for a predetermined period of time after rising or falling of the count pulses of the manually operated ring is detected, and stops the continuous high-speed driving of the driving means after the predetermined period of time has passed.

If the lens driver is thus configured, it is user friendly because the lens can be continuously moved or extended at fixed high speed when high speed movement of the lens is required, and driving of the lens is stopped when the predetermined period of time passes.

Still furthermore, the configuration may be such that the rotation detection means generates count pulses according to rotation of the manually operated ring, and the driving control means determines start of rotation of the manually operated ring on the basis of rising of the count pulses, sets the number of pulses of driving pulses which drive the driving means depending on a cycle of the count pulses and in synchronization with the count pulses in the normal control mode, continuously drives the driving means at fixed high speed in the high-speed control mode regardless of a change in a cycle of the count pulses for a predetermined period of time after rising or falling of the count pulses of the manually operated ring is detected, drives the driving means at fixed high speed which is faster than the high-speed driving when the cycle of the count pulses falls below a predetermined value, and stops the continuous high-speed driving of the driving means after the predetermined period of time passes.

If the lens driver is thus configured, even higher-speed driving of the lens can be implemented.

A configuration may be such that an autofocus macro button which is used to automatically implement a focusing function for macro shooting upon being pressed is also used as the switching means, and the high-speed control mode is associated with the pressing and the normal control mode is associated with non-pressing.

Such configuration enables switching between the normal mode and the high-speed mode without providing a dedicated part as the switching means, because switching to high-speed driving of the focus lens by the manually operated ring can be implemented through the use of the existing autofocus macro button.

Preferably, a camera is provided with display processing means which displays on a monitor screen a distance indication frame and a distance indication bar which moves along the distance indication frame and indicates a position of the lens, and if the display processing means changes a display color of the bar between a case where the autofocus macro button is pressed and the a case where the autofocus macro button is not pressed, because then a mode switching state can be visually recognized.

In such a case, preferably, the display processing means is configured to change the width of the distance indication frame and the distance indication bar, because the mode switching can be recognized visually more clearly.

A lens driver according to a fifth aspect of the present invention includes: a manually operated ring provided on a lens barrel and configured to be manually rotated relative to the lens barrel; rotation detection means configured to generate count pulses according to rotation of the manually operated ring and to detect rotation direction and rotating speed of the manually operated ring on the basis of rotation thereof; focus lens driving means configured to drive a focus lens; focus lens position detection means configured to detect a focus lens position of the focus lens; and driving control means configured to control the focus lens driving means in synchronization with the count pulses detected by the rotation detection means and so that a driving cycle with respect to the count pulses is different depending on the focus lens position detected by the focus lens position detection means.

The configuration may be such that the driving control means controls the focus lens driving means in synchronization with a coarse cycle of the count pulses when the focus lens position is on a long distance side, and controls the focus lens driving means in synchronization with a fine cycle of the count pulses when the focus lens position is on a short distance side.

Furthermore, the configuration may be such that the driving control means controls the focus lens driving means in synchronization with a single cycle of the count pulses when the focus lens position is on the long distance side, and controls the focus lens driving means in synchronization with a half cycle of the count pulses when the focus lens position is on the short distance side.

Still furthermore, the configuration may be such that the driving control means controls the focus lens driving means in synchronization with two cycles of the count pulses when the focus lens position is on the long distance side, and controls the focus lens driving means synchronous with a half cycle of the count pulses when the focus lens position is on the short distance side, and controls the focus lens driving means in synchronization with a single cycle of the count pulses when the focus lens position is on a medium distance side.

This configuration is preferable, because the focus lens can be stopped at a desired position by operating the manually operated ring, even when the focus lens position is on the long distance side.

If the lens driver is mounted on an imaging device, photographing can be performed with lens driving with the manually operated ring more efficiently utilized.

BRIEF DESCRIPTION OF THE DRAWINGS

FIG. 2 is a block diagram showing a configuration of main parts of the camera shown in FIG. 1.

FIG. 3 is a diagram illustrating a principle of detecting the rotation of a manually operated ring of the present invention. FIG. 3A is a schematic view showing an arrangement of the manually operated ring and photo interrupters. FIG. 3B is a waveform chart of count pulses for illustrating the principle of detecting the rotation of the manually operated ring in the positive direction. FIG. 3C is a waveform chart of count pulses for illustrating the principle of detecting the rotation of the manually operated ring in the negative direction.

FIG. 5A is a diagram illustrating a relation between count pulses and driving pulses in a normal control mode. FIG. 5B is a diagram illustrating a relation between the count pulses and the driving pulses in a high-speed control mode. FIG. 5C is a diagram illustrating a relation between the count pulses and the driving pulses in the high-speed control mode and illustrates continuous driving. FIG. 5D is a diagram illustrating another example of the continuous driving shown in FIG. 5C.

FIG. 11 is a timing chart for illustrating a relation between a cycle of count pulses and a driving cycle of a focus lens according to Embodiment 2.

DESCRIPTION OF THE PREFERRED EMBODIMENTS

Embodiments of an imaging device equipped with a lens driver according to the present invention will be described in detail hereinafter with reference to the drawings.

Embodiment 1

Overall Configuration of a Camera as an Imaging Device

Figure 1:
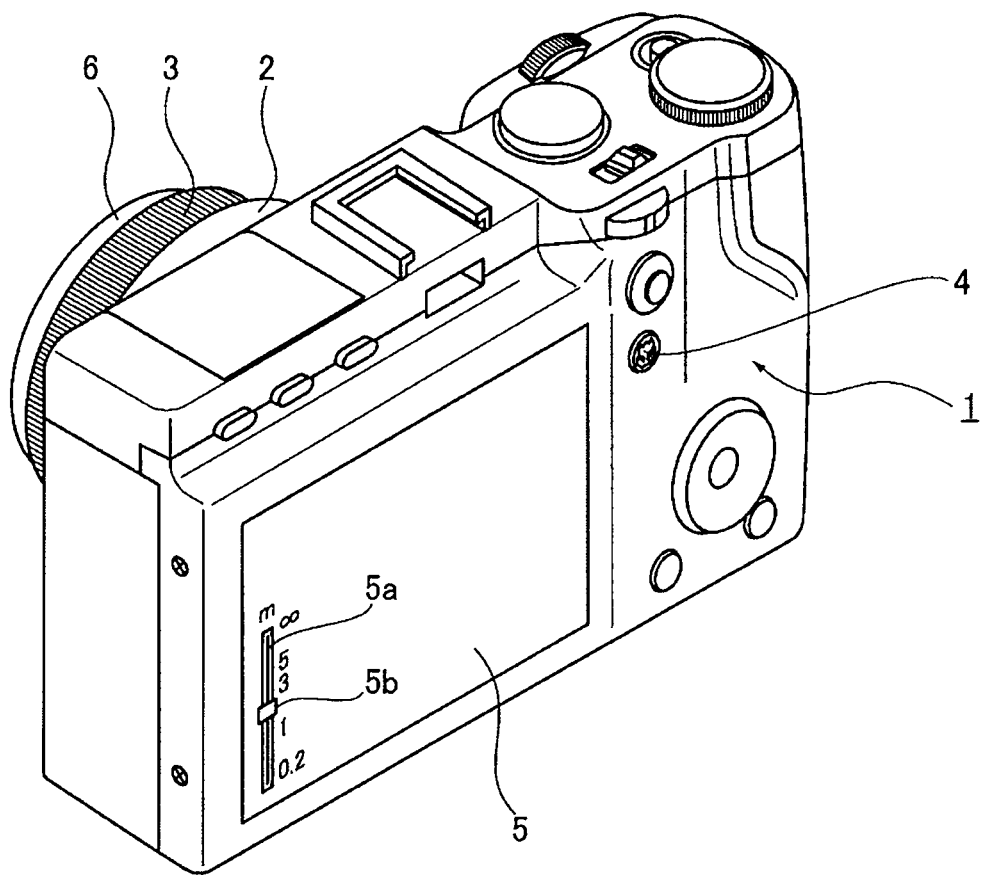
FIG. 1 is a perspective view of a camera according to Embodiment 1 of the present invention viewed from a rear side.

FIG. 1 is an external view of a camera according to the present invention. In FIG. 1, numeral 1 designates a camera body, 2 a lens barrel unit, 3 a manually operated ring, 4 an autofocus macro button, 5 a monitor screen, and 6 a lens barrel having a focus lens.

FIG. 2 is a block diagram showing a configuration of main parts of the camera.

In the lens barrel unit 2, the manually operated ring 3, a zoom lens 7, the focus lens 8, a diaphragm unit 9, and a mechanical shutter 10 are provided.

The zoom lens 7 is driven by a zoom motor 11 as driving means, the focus lens 8 is driven by a focus motor 12 as driving means, the diaphragm unit 9 is driven by a diaphragm motor 13, and the mechanical shutter 10 is driven by a mechanical shutter motor 13'. The motors are driven by a motor driver 14 which forms a part of drive control means.

The zoom lens 7, the focus lens 8, the diaphragm unit 9, and the mechanical shutter 10 form a photographic optical system, and a photographic light beam from a subject is guided to a CCD 15 through the photographic optical system.

The CCD 15 is a solid-state image sensing device which photoelectrically converts optical images. A photoelectrically converted signal from the CCD 15 is inputted to an F/E (Front End)-IC 16.

The F/E (Front End)-IC 16 is formed by a CDS 17 which performs correlation double sampling for image noise removal, an AGC 18 which adjusts gain, an A/D 19 which performs digital signal conversion, and a timing generator (TG) 20.

A vertical synchronization signal VD and a horizontal synchronization signal HD are supplied to the timing generator 20 of the F/E (Front End)-IC 16 from a CCD1 signal processing block 22 which forms a part of a digital still camera processor 21. The CCD 15 is controlled by a CPU block 23 which forms a part of the digital still camera processor 21, and the timing generator (TG) 20 generates driving timing signals for the CCD 15 and the F/E (Front End)-IC 16.

The digital still camera processor 21 performs white balancing setting or gamma setting on output data of the F/E-IC 16 with CCD 15. The digital still camera processor 21 includes: the already-described CCD1 signal processing block 22 which supplies the vertical synchronization signal VD and the horizontal synchronization signal HD; a CCD2 signal processing block 24 which converts the signals to brightness data/color difference data through filtering process; the already-described CPU block 23 which controls an operation of each part of the device; a Local SRAM 25' which temporarily stores data or the like necessary for the control; an SDRAM 25; a USB block 26 which performs USB communication with an external device such as a personal computer or the like; a serial block 27 which performs serial communication with the external device such as the personal computer or the like; a JPEG CODEC block 28 which performs JPEG compression/extension; a RESIZE block 29 which resizes image data through interpolation processing; a TV signal display block 30 which converts the image data into a video signal to be displayed on an external display device such as an LCD monitor or a TV; and a memory card controller block 31 which controls a memory card for recording photographed image data.

The SDRAM 25 temporarily stores image data when the already-described digital still camera processor 21 performs various processes on the image data. The image data to be stored includes "RAW-RGB image data" which has been captured from the CCD 15 through the F/E-IC 16 and on which white balancing setting and gamma setting have been performed in the CCD1 signal processing block 22, "YUV image data" on which conversion into intensity data/color difference data has been performed in the CCD2 signal processing block 24, "JPEG image data" which has been JPEG compressed in the JPEG CODEC block 28 or the like.

An internal memory 32 is a memory for allowing photographed image data to be stored. An LCD driver 33 is a drive circuit which drives an LCD monitor 34 having the already-described monitor screen 5, and functions as a part of display processing means.

The LCD driver 33 also serves as display processing control means to be described later, and has a function of converting a video signal outputted from the TV signal display block 30 into a signal to be displayed on the monitor screen 5 of the LCD monitor 34. The LCD monitor 34 is a monitor used for monitoring a state of a subject before photographing, checking photographed images, and displaying image data recorded in a memory card, the already-described internal memory 32 or the like.

A video AMP 36 is an amplifier for performing 75*n* impedance conversion on a video signal outputted from the TV signal display block 30, and a video jack 37 is a jack used for connection with an external display device such as a TV. An operation key unit 38 is a key circuit to be operated by a user. A SUB-CPU 39 is a CPU where a ROM and RAM are embedded in a single chip, and outputs an output signal of the operation key unit 38 or the like as user operation information to the already-described CPU block 23. The operation key unit 38 also includes the already-described autofocus macro button 4.

An audio CODEC 40 converts audio data outputted from an audio block 35 into a signal that can be outputted from a speaker 41.

A strobe circuit 42 is controlled by the CPU block 23 to cause a strobe light emission section 43 to emit light. A distance measuring unit 44 is controlled by the CPU block 23 to measure a distance to a subject, and output distance measurement information to the CPU block 23. Since their configurations are publicly known, a detailed description thereof will be omitted.

<Description of Configuration of Manually Operated Ring 3 and Method for Detecting Rotation>

FIG. 3A is a schematic view showing a configuration of a manually operated ring 3. Here, the manually operated ring 3 is formed of an operating section 3*a* and a rotating tube 3*b*. Comb teeth 3*c* are formed at an end of the rotating tube 3. A pair of photo interrupters 45*a*, 45*b* faces the comb teeth 3*c*. The comb teeth 3*c* and the pair of photo interrupters 45*a*, 46*b*, cooperating with the rotating tube 3*b*, form a part of rotation detection means (detection sensor) 45.

The pair of photo interrupters 45*a*, 45*b* includes a light emitting element which emits a detection light beam and a light receiving element which receives the detection light. The pair of photo interrupters 45*a*, 45*b* is arranged so that phases of count pulses outputted from the light receiving elements of the pair of photo interrupters 45*a*, 45*b* deviate for 90 degrees.

When the operating section 3*a* is rotated, the rotating tube 3*b* integrally rotates. Then, the detection light beam of the pair of photo interrupters 45*a*, 45*b* is intermittently blocked by the comb teeth 3*c*. Thus, count pulses are outputted from the light receiving elements of the pair of photo interrupters 45*a*, 45*b* according to the rotating speed.

FIG. 3B and FIG. 3C are diagrams illustrating the count pulses. For convenience of description, a description will be given with the photo interrupter 45*a* of the pair referred to as a first sensor and the photo interrupter 45*b* of the pair referred to as a second sensor.

As shown in FIG. 3B, when the manually operated ring 3 is turned clockwise, for example, the count pulse PL1 of the first sensor rises from low (L) to high (H). When the count pulse PL1 rises, count pulse PL2 of the second sensor is at low level (L). When the count pulse PL1 falls, the count pulse PL2 of the second sensor is at high level (H).

As shown in FIG. 3C, when the manually operated ring 3 is turned counterclockwise, for example, count pulse PL1 of the first sensor rises from low (L) to high (H). When the count pulse PL1 rises, count pulse PL2 of the second sensor is at high level (H). When the count pulse PL1 falls, the count pulse PL2 of the second sensor is at low level (L).

Therefore, rotation direction of the manually rotated ring 3 is detected depending on whether the count pulse PL2 is at high level (H) or low level (L) when the count pulse PL1 rises and falls.

The count pulses PL1, PL2 are inputted into the CPU block 23 as positive and negative direction rotation signals. Together with the pair of photo interrupters 45*a*, 45*b*, the CPU block 23 forms the rotation detection means 45, and can determine whether the rotation direction of the manually operated ring 3 is positive direction or negative direction, by determining the signal level of the count pulse PL2 of the second sensor when the count pulse PL1 of the first sensor rises and falls.

In addition, the CPU block 23 can detect not only the amount of rotation of the manually operated ring 3 by counting the number of the count pulses PL1 every time the first sensor rises or falls, but also the rotating speed of the manually operated ring 3 by measuring a period of time (cycle T) from the point when the first sensor rises to the point when it falls.

When pressed, the autofocus macro button 4 automatically implements a focusing function for macro photographing. Here, the autofocus macro button 4 is also used as switching means for switching a control mode, on the basis of detection result of the rotation detection means 45, between a normal control mode in which the focus lens 8 is driven at normal driving speed according to the rotation speed of the manually operated ring 3 and a high-speed control mode in which the focus lens 8 is driven at fast driving speed which is faster than that in the normal driving speed.

The CPU block 23 serves as driving control means which controls the focus motor 12 so that the focus lens 8 is driven at the normal driving speed when the normal control mode is set, and is driven at the fast driving speed when the high-speed control mode is set.

Note that the camera is normally driven in an autofocus mode, and shifts to an operation mode of the manually operated ring (MF ring) 3 when a manual focus mode is turned on through a focus mode switching button (not shown) which switches between the autofocus mode and the manual focus mode.

Figure 4:
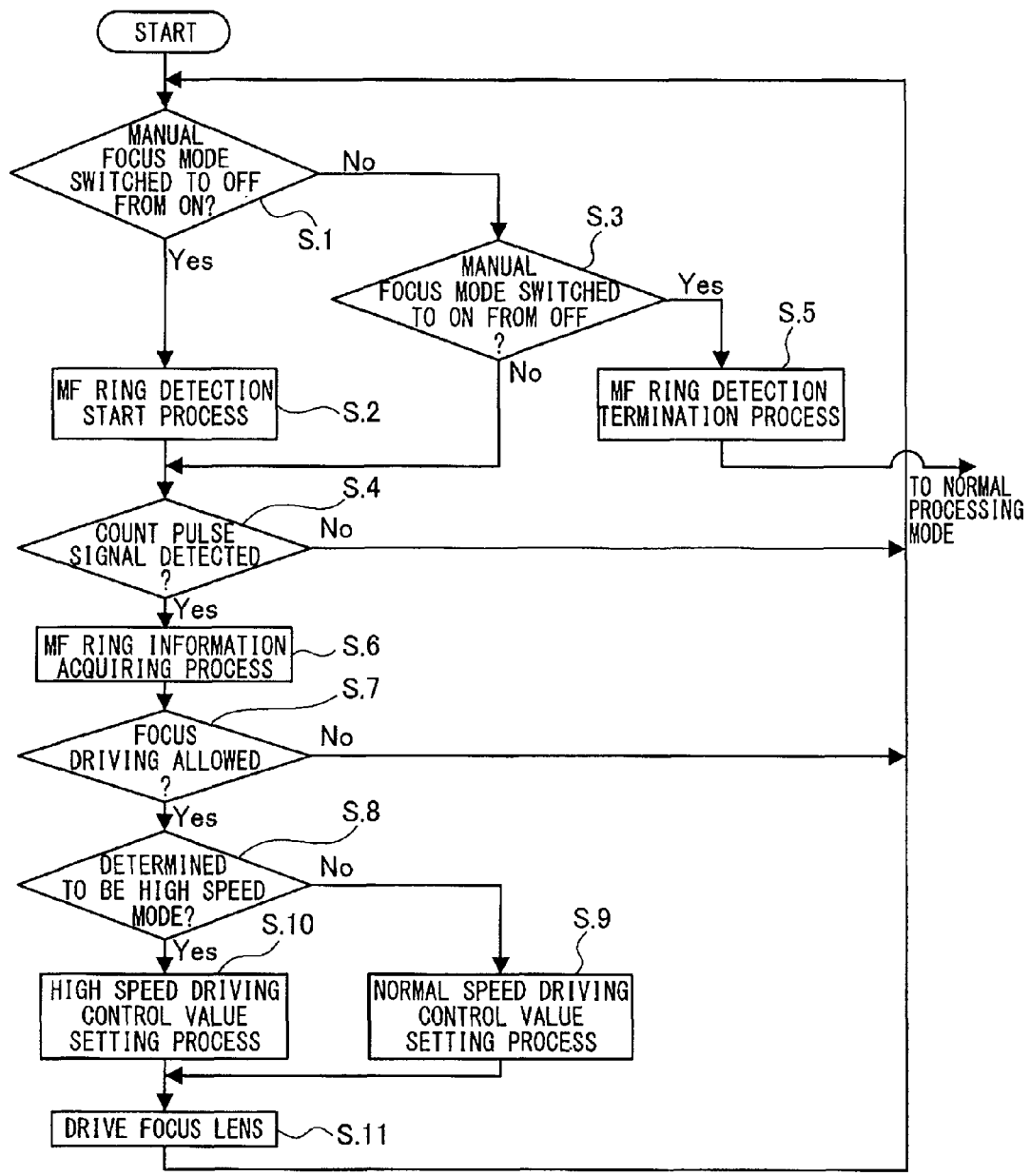
FIG. 4 is a flow chart illustrating operation when a lens driver according to the present invention operates the manually operated ring.

First, an operation of the lens driver of the present invention while the manually operated ring (MF ring) 3 is operated will be described based on the flow chart shown in FIG. 4. Subsequently, details of driving will be described.

<Description of Focusing Operation of Manually Operated Ring>

A CPU block 23 determines whether or not a camera is in a manual focus (MF) mode.

First, the CPU block 23 determines whether or not the manual focus mode has been switched from OFF to ON (S.1). When the manual focus mode has been switched from OFF to ON, the CPU block 23 determines YES, and proceeds to S.4 after performing process of starting rotation detection (S.2). In the rotation detection starting process (S.2) of the MF ring 3, rotation of the MF ring 3 can be detected by turning on the power of photo interrupters 45*a*, 45*b*.

When the manual focus mode has been ON in S.1, the CPU block 23 determines NO, and proceeds to S.3 where it determines whether the manual focus mode has been switched from ON to OFF (S.3).

When the manual focus mode remains ON in S.3, the CPU block 23 determines NO in S.3 and shifts to S.4 where it performs detection determination process of the count pulse (S.4).

When the manual focus mode is switched from ON to OFF, the CPU block 23 determines YES in S.3, performs termination process (S.5) of MF ring detection process, and returns to normal processing different from the manually operated ring mode processing. In the termination process (S.5) of the MF ring detection process, the photo interrupters 45a, 45b are turned off. This is to prevent unnecessary current consumption.

When the CPU block 23 enters the mode in which the manually operated ring 3 is used, in S.4, it determines whether or not the count pulses PL1, PL2 are detected from the photo interrupters 45a, 45b. When no change in the count pulses PL1, PL2 is detected, the CPU block 23 determines NO, returns to S.1, and continues to perform the processes of S.1, S.3, and S.4 unless the manual focus mode is switched from ON to OFF.

When a change in the count pulses PL1, PL2 is detected, the CPU block 23 determines YES, and performs MF ring information acquisition process (S.6).

In the MF ring information acquisition process, the CPU block 23 acquires the amount of rotation of the manually operated ring 3 (the number of counts of the count pulses PL1), rotating speed of the manually operated ring 3 (cycle T of the count pulses PL1), and rotation direction of the manually operated ring 3. The CPU block 23 determines rotating speed from the cycle T of the last count pulse PL1.

Then, the CPU block 23 performs focus driving permission determination (S.7). In the focus driving permission determination, the CPU block 23 determines whether or not the total number of counts of the count pulse PL1 is "equal to or greater than 2".

When the number of counts is less than "2", the CPU block determines NO, directly returns to S.1, and continues to perform the processes of S.1, S.3 to S.7 unless the manual focus mode is switched from ON to OFF. This process is to prevent sensitive reaction to minor rotation of the manually operated ring 3 due to vibration of the camera body 1 or the like.

When the CPU block 23 determines YES in S.7, it proceeds to S.8 where it performs process of determining whether or not the control mode is the high-speed mode.

The CPU block 23 determines whether the control mode is the high-speed mode or the normal mode, depending on whether or not the autofocus macro button 4 as the switching means is pressed.

When the autofocus macro button 4 is not pressed, the CPU block 23 determines NO, and performs setting of a driving control value for the normal speed (S.9). When the autofocus macro button 4 is pressed, the CPU block 23 determines YES, and performs setting of a driving control value for the high-speed driving (S.10). The number of driving pulses and the rotation direction are used as the driving control value.

Then, the CPU block 23 sends driving control data on the number of driving pulses and the rotation direction to the motor driver 14. Thus, the focus motor 12 as the lens driving means is driven by the motor driver 14. Then, based on the detection result of the rotation detection means 45, the focus lens 8 is actually driven (S.11) at the normal driving speed in accordance with the rotating speed of the manually operated ring 3 when the normal control mode is set or at the fast driving speed which is faster than the normal driving speed in the normal control mode when the high-speed driving mode is set.

Then, the CPU block 23 returns to the process of S.1, and continues to perform the processes of S.1, S.3 to S.11 unless the manual focus mode is switched from ON to OFF.

Figure 5:
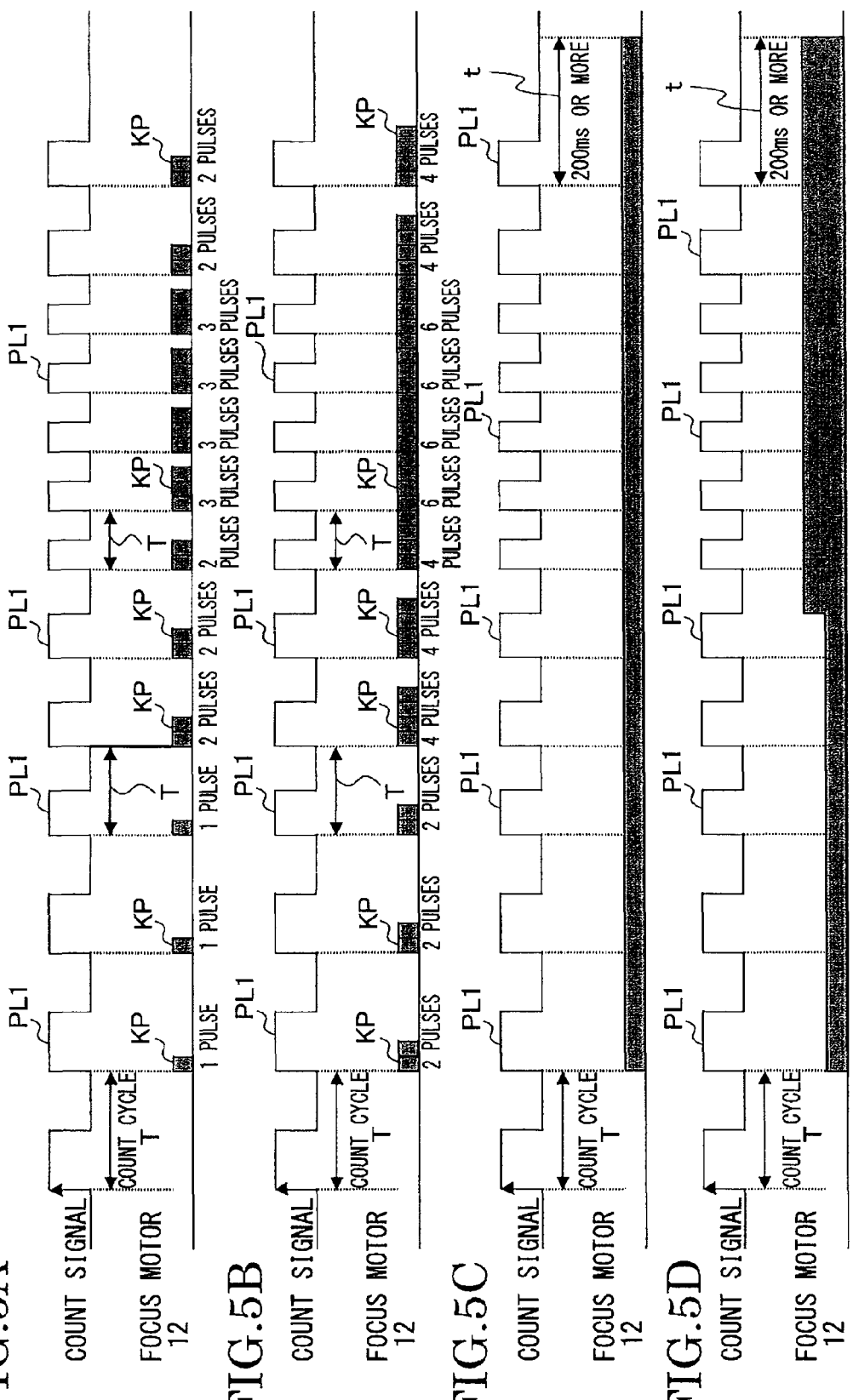
FIG. 5 is a timing chart for illustrating a relation between a cycle of count pulses and driving speed.

Details of driving by the manually operated ring 3 in the normal control mode and in the high-speed control mode will be described hereinafter with reference to the timing chart shown in FIG. 5.

(In a Normal Control Mode)

When the count pulse PL1 is inputted from the photo interrupter 45a as the rotation detection means 45, as shown in FIG. 5A, the CPU block 23 sets the number of pulses of driving pulses KP which drive the focus motor 12 in accordance with a cycle of the count pulse PL1 and in synchronization with rising of the count pulse PL1.

FIG. 5A shows an example in which one driving pulse KP is generated when the cycle T of the count pulse PL1 is equal to or greater than 100 ms, two driving pulses KP are generated when the cycle T of the count pulse PL1 is in the range between 80 ms inclusive and 100 ms exclusive, and three driving pulses KP are generated when the cycle T of the count pulse PL1 is in the range between 60 ms inclusive and 80 ms exclusive.

With this, in the normal control mode, the focus motor 12 is driving controlled depending on the rotating speed of the manually operated ring 3.

(In a High-Speed Control Mode)

When the count pulse PL1 is inputted from the photo interrupter 45a as the rotation detection means 45, similar to the normal control mode, the CPU block 23 sets the number of pulses of the driving pulses KP which drive the focus motor 12, depending on the cycle T of the count pulse PL1 and synchronous with rising of the count pulse PL1. However, as shown in FIG. 5B, the number of driving pulses KP to be generated in the high-speed control mode is twice the number of the driving pulses KP to be generated in the normal control mode.

In this FIG. 5B, although the number of the driving pulses KP to be generated in the high-speed control mode is twice the number of the driving pulses KP to be generated in the normal control mode, the number is not limited to this as long as it is twice or more.

If the lens driver is thus configured, when the focus lens 8 is required to be moved in high speed, the focus lens 8 can be driven at high speed while responding to operator's intention of high-speed driving with high fidelity, because the focus lens 8 can be moved or extended at the driving speed which is twice the normal speed in accordance with the operated speed of the manually operated ring 3.

In addition, as shown in FIG. 5B, although in this embodiment, the number of the driving pulses KP to be generated in the high-speed control mode is set to be twice the number of the driving pulses KP to be generated in the normal control mode, as shown in FIG. 5C, a configuration may be such that in the high-speed control mode, the focus motor 12 is continuously driven at fixed high speed regardless of any change in the cycle T of the count pulse PL1, for a predetermined period of time t after rising (or falling) of the count pulse PL1 of the manually operated ring 3 is detected, and the continuous high-speed driving of the focus motor 12 is terminated after the predetermined period of time t has passed.

Alternatively, the configuration may be such that the continuous high-speed driving of the focus motor 12 is terminated when inversion of the rotation detection of the manually operated ring 3 is detected.

The lens driver thus configured is user friendly because the focus lens 8 can be continuously moved or extended at fixed high speed and driving of the focus lens 8 is terminated after the predetermined period of time t passes.

In addition, although in the high-speed control mode as shown in FIG. 5C, the configuration is such that the focus motor 12 is continuously driven at fixed high speed regardless of any change in the cycle T of the counter pulse, for a predetermined period of time t after rising (or falling) of the count pulse PL1 of the manually operated ring 3 is detected, the configuration may be such that, as shown in FIG. 5D, in the high-speed control mode, the focus motor 12 is continuously driven at fixed high speed by applying constant voltage to the focus motor on the basis of the cycle T of the count pulse PL1 for a predetermined period of time t after rising (or falling) of the count pulse PL1 is detected, the focus motor 12 is driven at fixed-even higher speed by applying voltage which is higher than that in the high-speed driving, when the cycle T of the count pulse PL1 falls below a predetermined value, and the high-speed driving of the focus motor 12 is terminated after the predetermined period of time t passes. If the lens driver is thus configured, even higher speed driving of the focus lens 8 can be achieved.

In the embodiment, the autofocus macro button 4 which automatically implements the focusing function of macro photographing when pressed is also used as the switching means, and the high-speed control mode is associated with the pressing and the normal control mode is associated with non-pressing. Thus, the normal mode and the high-speed mode can be switched without providing a dedicated part as the switching means, because switching of high-speed driving of the focus lens 8 by the manually operated ring 3 can be performed through the use of the existing autofocus macro button 4.

Figure 6:
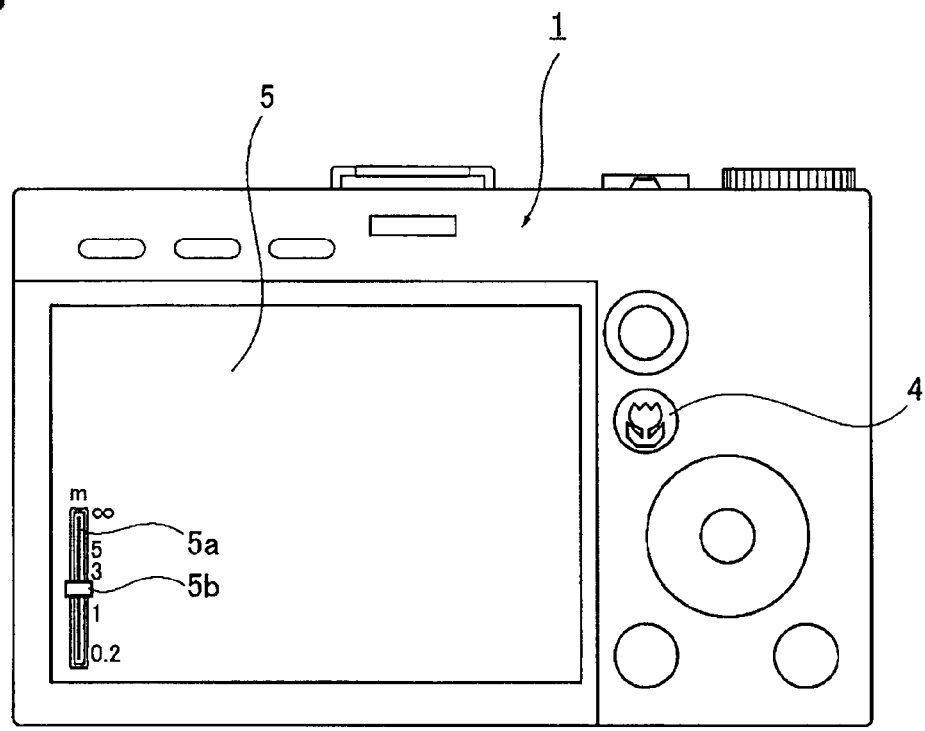
FIG. 6 is a diagram illustrating a state in which width of a distance indication frame and a distance indication bar appearing on a monitor screen is wide where a unit is "m".
Figure 7:
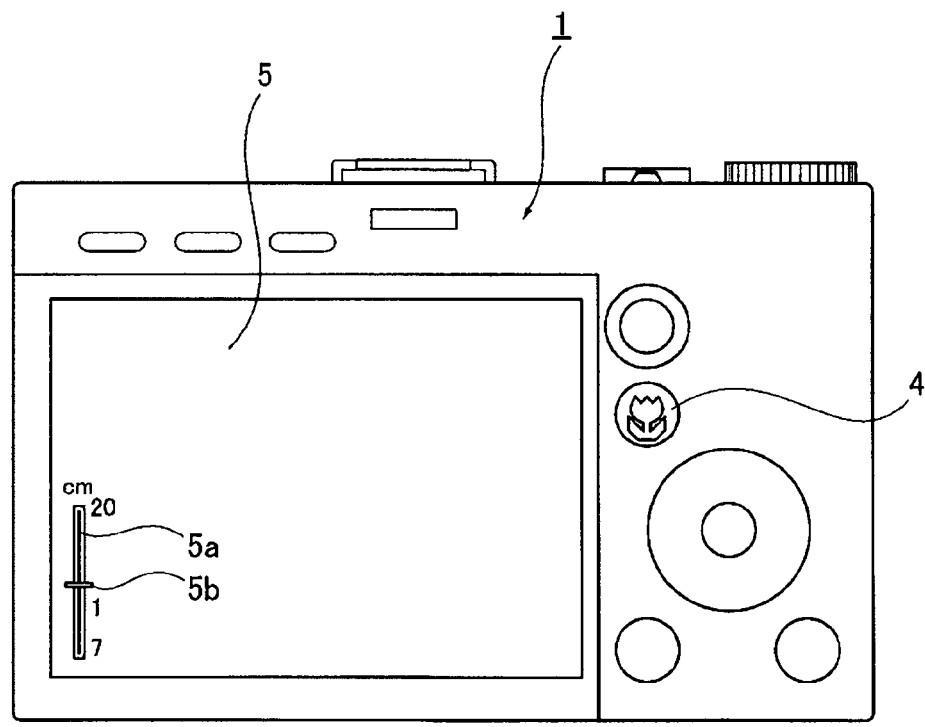
FIG. 7 is a diagram illustrating a state in which the width of the distance indication frame and the distance indication bar appearing on the monitor screen is narrow where a unit is "cm".

As shown in FIG. 1, FIG. 6, and FIG. 7, preferably, the LCD driver 33 and the CPU block 23 function as display processing means for displaying on the monitor screen 5 the distance indication frame 5*a* and the distance indication bar 5*b* which moves along the distance indication frame 5*a* and indicates an extended position of the focus lens 8, and the display processing means changes a display color of the bar in the pressing operation and the non-pressing operation of the autofocus macro button 4, so that the mode switching state can be visually recognized.

The display color of the distance indication frame 5*a* and the distance indication bar (focus bar) 5*b* is white when the autofocus macro button 4 is not pressed. The display color of the distance indication bar 5*b* while the autofocus macro button 4 is pressed is yellow. This is preferable because attention can be visually attracted when the autofocus macro button 4 is accidentally pressed.

In such a case, it is further desirable if the display processing control means is configured to change the width of the distance indication frame 5*a* and the distance indication bar 5*b* and to widen the frame width when the autofocus macro button 4 is pressed, as shown in FIG. 6, because attention can be even more visually attracted.

In addition, if guidance characters "Autofocus macro button+Manually operated ring high speed adjustment" is displayed on the monitor screen 5, a description of functions can be given on the monitor screen 5.

In the embodiment, although the manually operated driving of the focus lens 8 is described, the present invention is also applicable to manually operated driving of the zoom lens 7.

Embodiment 2

Figures 8, 9:
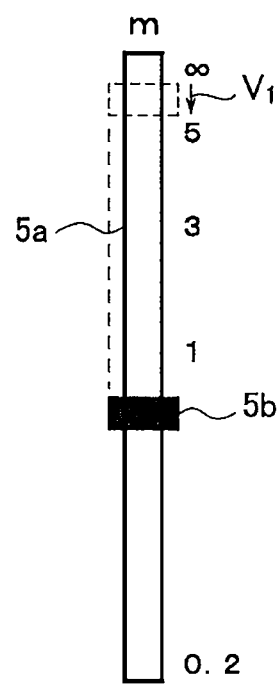
FIG. 8 is a diagram illustrating a lens driver according to Embodiment 2 and showing a correlation between a distance from a camera body to a subject and a focus lens position.
FIG. 9 is an enlarged view showing a relation between the distance indication frame and the distance indication bar appearing on the monitor screen.

FIG. 8 is a diagram illustrating a lens driver according to Embodiment 2 of the present invention, showing a correlation between a distance from a camera body 1 to a subject and a driving position of the focus lens 8. FIG. 9 is an enlarged view showing a relation between the extended amount of the focus lens 8 and a distance indication frame.

As shown in FIG. 8, in a conventional camera, a lens position of the focus lens 8 "0" is associated with a distance to a subject "∞", the lens position of the focus lens 8 "2" is associated with the distance to the subject "10 m", the lens position of the focus lens "4" is associated with the distance to the subject "5 m", the lens position of the focus lens 8 "7" is associated with the distance to the subject "3 m", the lens position of the focus lens 8 "25" is associated with the distance to the subject "1 m", the lens position of the focus lens 8 "93" is associated with the distance to the subject "30 cm", and the lens position of the focus lens 8 "158" is associated with the distance to the subject "20 cm".

Thus, in the conventional camera, on the long distance side, a relation between the extension amount of the focus lens 8 and a distance to the subject, that is to say, lens position resolution is coarse, and to the contrary, on the short distance side, the relation between the feed amount of the focus lens 8 and the distance to the subject is fine, and thus the lens position resolution is dense.

Therefore, when rotation of the manually operated ring 3 moves the focus lens 8, pulse responsiveness on the long distance side is sensitive. When the focus lens position is on the long distance side, it is difficult to stop the focus lens 8 at a desired position by operating the manually operated ring 3.

That is to say, as shown in the enlarged view in FIG. 9, if the rotating speed of the manually operated ring 8 is the same, regarding a movement amount of the distance indication bar 5*b* relative to the distance indication frame 5*a*, for example, moving speed V1 of the distance indication bar 5*b* on the distance indication frame 5*a* relative to the distance is large when the subject is on the long distance side, and thus it is difficult to stop the focus lens 8 at a desired position on the long distance side in the lens driver according to Embodiment 1.

Thus, if the amount of rotation of the manually operated ring 3 is the same, the movement amount of the focus lens 8 relative to the subject distance varies more widely when the lens is on the long distance side.

Accordingly, the lens driver according to Embodiment 2 is configured to determine whether or not a lens position of the focus lens 8 is on the long distance side, and to make the movement amount of the focus lens 8 relative to the amount of rotation of the manually operated ring 3 smaller than on the short distance side, if the lens position of the focus lens 8 is on the long distance side.

To see it in the opposite perspective, when the lens position of the focus lens 8 is on the long distance side, the amount of rotation of the manually operated ring 3 per minimum movement amount of the focus lens 8 is increased compared with when the lens position of the focus lens 8 is on the short distance side. Thus, responsiveness to the amount of rotation of the manually operated ring 3 on the long distance side is made less sensitive than on the short distance side. Accordingly, the focus lens 8 can be more easily stopped at a desired position.

Figure 10:
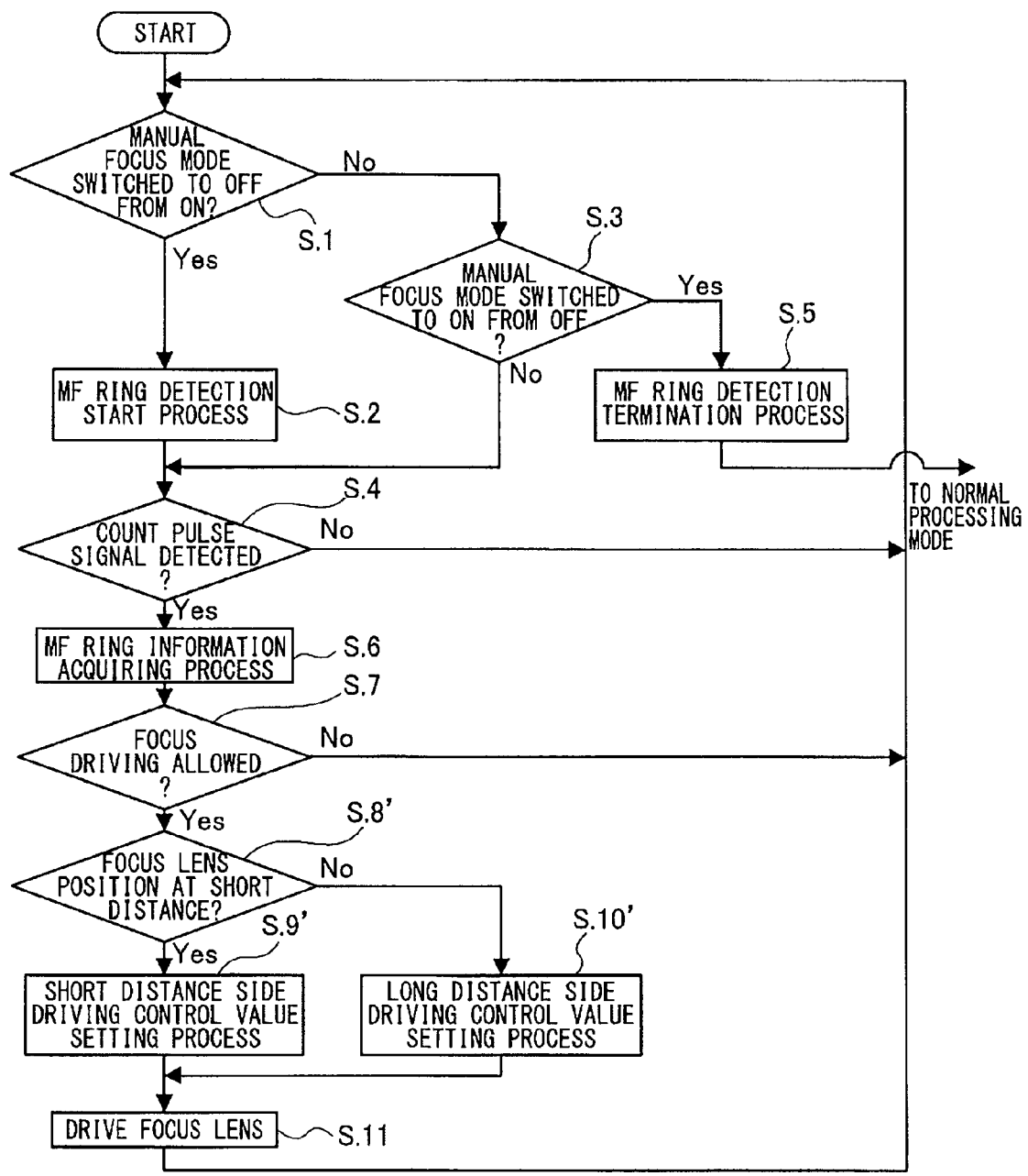
FIG. 10 is a flow chart illustrating an operation when the lens driver according to Embodiment 2 operates the manually operated ring.

FIG. 10 is a flow chart illustrating an operation of the lens driver according to Embodiment 2. In FIG. 10, as the processes from S.1 to S.7 are same as those in Embodiment 1, a detailed description thereof will be omitted, and differences will be described.

When it is determined YES in S.7, the CPU block 23 proceeds to S.8' where it determines whether or not the lens position of the focus lens 8 is on the long distance side or on the short distance side (S.8').

Now, considering a case in which the lens position of the focus lens is at an infinity position is a reference "0", the CPU block 23 determines that the focus lens 8 is on a long distance side when the lens position is less than "25" pulses (corresponding to 1 m when converted into a subject distance), and determines that the focus lens 8 is on a short distance side when the lens position is equal to or more than "25" pulses.

If the CPU block 23 determines in S.8' that the lens position of the focus lens 8 is on the short distance side, it proceeds to short distance side driving control value setting process (S9'). If the CPU block 23 determines in S.8' that the lens position of the focus lens 8 is on the long distance side, it proceeds to long distance side driving control value setting process (S.10').

Figure 11A:
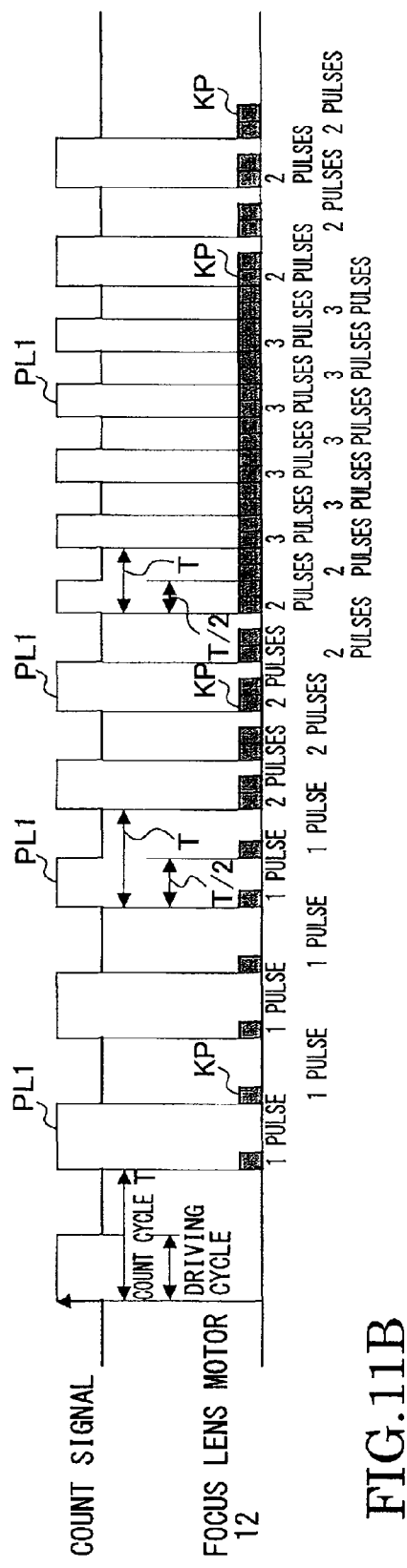
FIG. 11A is a diagram illustrating a relation between the cycle of the count pulses and the driving cycle of the focus lens when the focus lens position is on the short distance side.

When the count pulse PL1 is inputted from a photo interrupter 45a as rotation detection means 45 in S.9', as shown in FIG. 11A, the CPU block 23 detects rising of the count pulse PL1 in the short distance side driving control value setting process, and measures a cycle T of the count pulse PL1. The CPU block 23 sets the number of driving pulses KP, depending on a half cycle of the cycle T of the count pulse PL1. It also sets rotation direction of the focus motor 12.

Then, the CPU block 23 sends driving control data on the number of driving pulses and the rotation direction to a motor driver 14, and controls the driving of the focus lens 8 in synchronization with rising and falling of the count pulse PL1 (S.11). When the count pulses PL1 and PL2 are generated during driving of the focus lens 8, the CPU block 23 continues to drive the focus lens 8. It also updates a display position of the distance indication bar 5b as shown in FIG. 9 in accordance with the lens position of the focus lens 8.

Figure 11B:
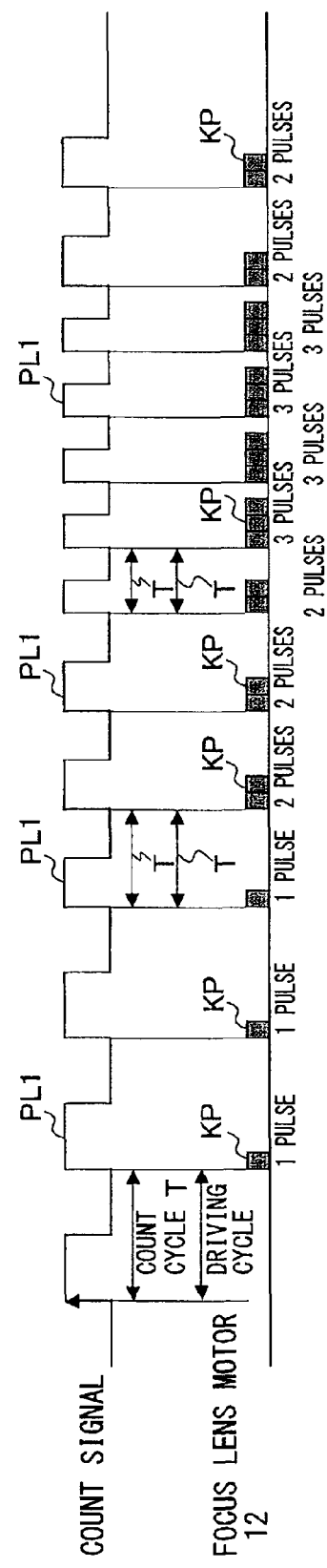
FIG. 11B is a diagram illustrating a relation between the cycle of the count pulses and the driving cycle of the focus lens when the focus lens position is on the long distance side.

When the count pulse PL1 is inputted from a photo interrupter 45a as rotation detection means 45 in S.10, as shown in FIG. 11B, the CPU block 23 detects rising of the count pulse PL1 in the long distance side driving control value setting process, and measures a cycle T of the count pulse PL1. The CPU block 23 sets the number of driving pulses KP, depending on a half cycle of the cycle T of the count pulse PL1. It also sets rotation direction of the focus motor 12.

Then, the CPU block 23 sends driving control data on the number of driving pulses and the rotation direction to a motor driver 14, and driving controls the focus lens 8 in synchronization with rising and falling of the count pulse PL1 (S.11). Similarly to the short distance side driving control value setting process, when the count pulses PL1 and PL2 are generated during driving of the focus lens 8, the CPU block 23 continues to drive the focus lens 8. It also updates a display position of the distance indication bar 5b as shown in FIG. 9 in accordance with the lens position of the focus lens 8.

Therefore, when the rotating speed of the manually operated ring 3, that is to say, the amount of rotation per unit time of the manually operated ring 3, is the same, the driving speed of the focus lens 8 is faster when the lens position of the focus lens 8 is on the short distance side, and the driving speed of the focus lens 8 is slower when the lens position of the focus lens 8 is on the long distance side.

If it is desired to further decelerate the driving speed of the focus lens 8 on the long distance side relative to that in the short distance side when the rotating speed of the manually operated ring 3 is the same, the configuration may be such that one pulse is generated every time the count pulse PL1 rises in the second cycle.

That is to say, the CPU block 23 functions as focus lens position detection means that detects the focus lens position of the focus lens 8 and driving control means which controls focus lens driving means in synchronization with the count pulses PL1, PL2 detected by the rotation detection means and so that a driving cycle with respect to the count pulses PL1, PL2 is different depending on the focus lens position detected by the focus lens position detection means.

In addition, also in Embodiment 2, an example is shown in which in both the short distance side driving control value setting process and the long distance side driving control value setting process, similar to Embodiment 1, one driving pulse KP is generated when the cycle T of the count pulse PL1 is equal to or greater than 100 ms, two driving pulses KP are generated when the cycle T of the count pulse PL1 is in the range between 80 ms inclusive and 100 ms exclusive, and three driving pulses KP are generated when the cycle T of the count pulse PL1 is in the range between 60 ms inclusive and 80 ms exclusive.

In addition, in Embodiment 2, although the case in which the lens position of the focus lens 8 is on the short distance side and the case in which the lens position of the focus lens 8 is on the long distance side are described, the configuration may be such that the lens position of the focus lens 8 equal to less than "∞" and more than "1 m" is set as the long distance side, the lens position equal to less than "1 m" and more than "0.5 m" is set as the medium distance side, and the lens position equal to less than "0.5 m" to close range is set as the short distance side, and the focus lens driving motor is driving controlled for every 2 cycles of the count pulse PL1 for the lens position from "∞" to "1 m" exclusive, the focus lens driving motor is driving controlled for every 1 cycle of the count pulse PL1 for the lens position in the range between "1 m" inclusive and "0.5 m" exclusive, and the focus motor 12 is driving controlled for every one-half cycle of the count pulse PL1 for the lens position from "0.5 m" to the close range.

In addition, the CPU block 23 may be configured to control the focus lens driving means in synchronization with a coarse cycle of the count pulses PL1, PL2 when the focus lens position is on the long distance side, and to control the focus lens driving means synchronous with a fine cycle of the count pulses when the focus lens position is on the short distance side.

With the aforementioned embodiments according to the present invention, it is possible to provide a lens driver which allows precise lens positioning to a target focused position swiftly and accurately even when the lens has to be set at the target focused position through manual operation of the manually operated ring with large lens movement amount.

In addition, the focus lens can be stopped at a desired position by operating the manually operated ring, even when the focus lens position is on the long distance side and thus, effects of fully utilizing advantage of operating the manually operated ring and improving user friendliness can be achieved.

Although the preferred embodiments of the present invention have been described, it should be understood that the present invention is not limited to these embodiments, various modifications and changes can be made to the embodiments.

What is claimed is:

1. A lens driver of two-phase pulse system, comprising:
  a driver configured to drive a lens;
  a manually operated ring provided on a lens barrel and configured to be manually rotated relative to the lens barrel;
  a rotation detector configured to detect a rotation direction and a rotating speed of the manually operated ring on the basis of a rotation of the manually operated ring;
  a switcher configured to switch a control mode, on the basis of a detection result of the rotation detector, between a normal control mode in which the lens is driven at a normal driving speed depending on the rotating speed of the manually operated ring and a high-speed control mode in which the lens is driven at a high driving speed which is faster than the normal driving speed in the normal control mode, an autofocus macro button which, upon being pressed, automatically activates a focusing function for a macro photographing, being used as the switcher, the control mode being in the high-speed control mode when the switcher is activated, and the control mode being in the normal control mode when the switcher is deactivated; and a driving controller configured to control the driver so that the lens is driven at the normal driving speed when the normal control mode is set and to control the driver so that the lens is driven at the high driving speed when the high-speed control mode is set, wherein the rotation detector generates count pulses according to the rotation of the manually operated ring, and the driving controller determines a start of the rotation of the manually operated ring on the basis of a rising of the count pulses, sets a number of pulses of driving pulses which drive the driver depending on a cycle of the count pulses and in synchronization with the count pulses in the normal control mode, continuously drives the driver at a fixed high speed in the high-speed control mode regardless of a change in a cycle of the count pulses for a predetermined period of time after a rising or a falling of the count pulses of the manually operated ring is detected, and stops the continuous high-speed driving of the driver after the predetermined period of time passes.

2. The lens driver according to claim 1, wherein the rotation detector generates count pulses according to the rotation of the manually operated ring, and the driving controller determines a start of the rotation of the manually operated ring on the basis of a rising of the count pulses, and sets a number of pulses of driving pulses which drive the driver depending on a cycle of the count pulses and in synchronization with the count pulses, and the number of driving pulses to be generated in the high-speed control mode is twice the number of driving pulses to be generated in the normal control mode.

3. The lens driver according to claim 1 further comprising:

a display processor configured to display on a monitor screen a distance indication frame and a distance indication bar which moves along the distance indication frame and indicates a position of the lens, wherein the display processor changes a display color of the bar between a case where the autofocus macro button is pressed and a case where the autofocus macro button is not pressed.

4. The lens driver according to claim 3, wherein the display processor changes a width of the distance indication frame and the distance indication bar.

5. An imaging device, comprising:

the lens driver according to claim 1.

6. A lens driver of two-phase pulse system, comprising:

a driver configured to drive a lens;

a manually operated ring provided on a lens barrel and configured to be manually rotated relative to the lens barrel;

a rotation detector configured to detect a rotation direction and a rotating speed of the manually operated ring on the basis of a rotation of the manually operated ring;

a switcher configured to switch a control mode, on the basis of a detection result of the rotation detector, between a normal control mode in which the lens is driven at a normal driving speed depending on the rotating speed of the manually operated ring and a high-speed control mode in which the lens is driven at a high driving speed which is faster than the normal driving speed in the normal control mode, an autofocus macro button which, upon being pressed, automatically activates a focusing function for a macro photographing, being used as the switcher, the control mode being in the high-speed control mode when the switcher is activated, and the control mode being in the normal control mode when the switcher is deactivated; and a driving controller configured to control the driver so that the lens is driven at the normal driving speed when the normal control mode is set and to control the driver so that the lens is driven at the high driving speed when the high-speed control mode is set, wherein the rotation detector generates count pulses according to the rotation of the manually operated ring, and the driving controller determines a start of the rotation of the manually operated ring on the basis of a rising of the count pulses, sets a number of pulses of driving pulses which drive the driver depending on a cycle of the count pulses and in synchronization with the count pulses in the normal control mode, continuously drives the driver at a fixed high speed in the high-speed control mode regardless of a change in a cycle of the count pulses for a predetermined period of time after a rising or a falling of the count pulses of the manually operated ring is detected, drives the driver at a fixed high speed which is faster than the high-speed driving when the cycle of the count pulses falls below a predetermined value, and stops the continuous high-speed driving of the driver after the predetermined period of time passes.

7. The lens driver according to claim 6, wherein the rotation detector generates count pulses according to the rotation of the manually operated ring, and the driving controller determines a start of the rotation of the manually operated ring on the basis of a rising of the count pulses, and sets a number of pulses of driving pulses which drive the driver depending on a cycle of the count pulses and in synchronization with the count pulses, and the number of driving pulses to be generated in the high-speed control mode is twice the number of driving pulses to be generated in the normal control mode.

8. The lens driver according to claim 6 further comprising:

a display processor configured to display on a monitor screen a distance indication frame and a distance indication bar which moves along the distance indication frame and indicates a position of the lens, wherein the display processor changes a display color of the bar between a case where the autofocus macro button is pressed and a case where the autofocus macro button is not pressed.

9. The lens driver according to claim 8, wherein the display processor changes a width of the distance indication frame and the distance indication bar.

10. An imaging device, comprising:

the lens driver according to claim 6.

11. A lens driver of two-phase pulse system, comprising:

a driver configured to drive a lens;

a manually operated ring provided on a lens barrel and configured to be manually rotated relative to the lens barrel;

a rotation detector configured to detect a rotation direction and a rotating speed of the manually operated ring on the basis of a rotation of the manually operated ring, and to generate count pulses according to the rotation of the manually operated ring;

a switcher configured to switch a control mode, on the basis of a detection result of the rotation detector, between a normal control mode in which the lens is driven at a normal driving speed depending on the rotating speed of the manually operated ring and a high-speed control mode in which the lens is driven at a high driving speed which is faster than the normal driving speed in the normal control mode, an autofocus macro button which, upon being pressed, automatically activates a focusing function for a macro photographing, being used as the switcher, the control mode being in the high-speed control mode when the switcher is activated, and the control mode being in the normal control mode when the switcher is deactivated; and a driving controller configured to control the driver so that the lens is driven at the normal driving speed when the normal control mode is set, to control the driver so that the lens is driven at the high driving speed when the high-speed control mode is set, to continuously drive the driver at a fixed high speed in the high-speed control mode regardless of a change in a cycle of the count pulses for a predetermined period of time after a rising or a falling of the count pulses of the manually operated ring is detected, and to stop the continuous high-speed driving of the driver after the predetermined period of time passes.

\* \* \* \* \*